(12) United States Patent
Park et al.

(10) Patent No.: US 11,995,963 B2
(45) Date of Patent: May 28, 2024

(54) LOGISTICS DEVICE, LOGISTICS CONTROL SYSTEM, AND THEFT PREVENTION METHOD OF THE SAME

(71) Applicant: Hyunsung Co., Ltd., Busan (KR)

(72) Inventors: Byung Kang Park, Anyang-si (KR); Hang Seok Choi, Seongnam-si (KR)

(73) Assignee: Hyunsung Co., Ltd., Busan (KR)

( * ) Notice: Subject to any disclaimer, the term of this patent is extended or adjusted under 35 U.S.C. 154(b) by 260 days.

(21) Appl. No.: 17/828,043

(22) Filed: May 31, 2022

(65) Prior Publication Data

US 2022/0383715 A1 Dec. 1, 2022

(30) Foreign Application Priority Data

May 31, 2021 (KR) .................. 10-2021-0069834

(51) Int. Cl.
G08B 21/00 (2006.01)
G06K 19/07 (2006.01)
G06Q 10/0833 (2023.01)
G08B 13/16 (2006.01)
H04W 4/02 (2018.01)
H04W 4/029 (2018.01)

(52) U.S. Cl.
CPC ..... *G08B 13/1609* (2013.01); *G06K 19/0707* (2013.01); *G06Q 10/0833* (2013.01); *H04W 4/023* (2013.01); *H04W 4/029* (2018.02)

(58) Field of Classification Search
CPC .......... G08B 13/1609; G08B 13/02; G06K 19/0707; G06Q 10/0833; G06Q 10/063; G06Q 10/087; H04W 4/023; H04W 4/029; G01D 21/02

USPC .......................................... 340/521
See application file for complete search history.

(56) References Cited

U.S. PATENT DOCUMENTS

| 5,757,270 A * | 5/1998 | Mori ................. G08B 13/1436 340/568.1 |
| 2018/0192374 A1* | 7/2018 | Jain .................. H04W 52/0254 |
| 2020/0092683 A1* | 3/2020 | Fyfe ..................... H04L 67/125 |
| 2020/0407019 A1* | 12/2020 | Fox ....................... G08B 13/02 |
| 2022/0150675 A1* | 5/2022 | Sakamoto .............. H04W 4/38 |

FOREIGN PATENT DOCUMENTS

JP 2017-017831 A 1/2017
KR 10-2017-0005778 A 1/2017

OTHER PUBLICATIONS

Office Action of Korean Patent Application No. 10-2021-0069834 mailed Sep. 7, 2023.

* cited by examiner

*Primary Examiner* — Mark S Rushing
(74) *Attorney, Agent, or Firm* — Revolution IP, PLLC

(57) ABSTRACT

Provided are a logistics device that is carried together with freight to detect a state, a logistics control system, and a theft prevention method of the same, wherein thee logistics device which is carried together with freight to detect a state includes a body carried together with freight and a controller configured to measure a speed of the body and vibrations applied to the body and determine whether the freight is stolen using the speed and the vibrations.

10 Claims, 5 Drawing Sheets

LOGISTICS DEVICE, LOGISTICS CONTROL SYSTEM, AND THEFT PREVENTION METHOD OF THE SAME

BACKGROUND

Field of the Invention

The present invention relates to a logistics device that is carried together with freight to prevent theft of the freight, a logistics control system, and a theft prevention method of the same.

Discussion of Related Art

Logistics has been put in place since the beginning of human economic activity. However, logistics has started attracting attention because companies are currently required to streamline the flow of goods accurately and quickly from the supply of raw materials to the delivery of finished products with the market's consumer-centric shift and the activation of e-commerce.

Logistics activities have started from derivative demands of economic activities that simply handle freight, such as transportation, storage, loading and unloading, and packaging, etc., and are in the limelight as a means of improving the efficiency of the overall industry with the development of global supply chain management techniques.

In the field of logistics, consignors and logistics companies aim for the common goal of reducing logistics costs, and thus in the development of a new logistics technology, it is necessary to achieve higher performance and strengthen linkages with more active and creative ideas.

Also, logistics technologies correspond to a complex application technology field in which logistics security, safety, and eco-friendly issues as well as a reduction in logistics costs should be taken into consideration.

The core of a logistics system and logistics process is to flexibly link freight, information, and money flow in the entire logistics process.

Therefore, logistics facilities, equipment, software technology, etc. required to achieve three goals of technology development, which are efficiency and effectiveness, security and safety, and sustainability and environmental benefit, according to processes of transportation, storage, loading and unloading, packaging, etc. correspond to logistics technologies.

Currently, fundamental logistics infrastructure and equipment for logistics rationalization and logistics technologies for more efficient running are under development.

The industrial environment is rapidly changing due to constant technological development, introduction of new management technique, etc. for holding a dominant position in the fierce competition of the global market. In such a change, the logistics industry, which is attracting attention as the core of competitiveness of the manufacturing industry, is also developing with technology development that is different from the concept in the past.

The logistics technology may be divided into company-based logistics technology and public sector logistics technology. The company-based logistics technology may be divided into a logistics running and solution field and a logistics infrastructure and facility field, and the public sector logistics technology corresponds to main means of logistics transportation such as railroad, road, sea, and air transportation.

Recent logistics environments were made for small amounts of goods, light and thin goods, and frequent deliveries due to demands of various customers, and it is necessary to cope with social changes such as lack of manpower, avoidance of physical work, increasing interest in the environment, etc.

These changes require the diversity and rapidity of service and the efficiency of management and running in the logistics industry.

In order for the logistics industry to appropriately meet these demands, it is necessary to flexibly manage information and money flow in a logistics system and an entire logistics process, and it is most important to link and integrate means and functions with each other in real time. Accordingly, development in underway on a system management and solution field for integrating and adjusting logistics processes over the entire supply chain.

Meanwhile, prevention of thefts is very important in the logistics industry.

SUMMARY OF THE INVENTION

The present invention is directed to providing a logistics device that is carried together with freight to prevent theft of the freight, a logistics control system, and a theft prevention method of the same.

However, the above object is exemplary, and the scope of the present invention is not limited thereto.

According to an aspect of the present invention, there is provided a logistics device which is carried together with freight to detect a state, the logistics device including a body carried together with freight and a controller configured to measure a speed of the body and vibrations applied to the body and determine whether the freight is stolen using the speed and vibrations.

When the vibrations of the body corresponding to the speed of the body deviate from a certain range at a specific time point, the controller may determine that the freight is stolen.

The logistics device may further include an acceleration sensor provided in the body and configured to detect an acceleration and a vibration sensor provided in the body and configured to detect the vibrations, and the controller may measure the speed after receiving information on the vibrations from the vibration sensor and receiving information on the acceleration from the acceleration sensor and determine that the freight is stolen when the specific vibrations corresponding to the specific speed deviate from the certain range.

The logistics device may further include a speed sensor provided in the body and configured to detect the speed and a vibration sensor provided in the body and configured to detect the vibrations, and the controller may receive information on the vibrations from the vibration sensor, receive information on the speed from the speed sensor, and determine that the freight is stolen when the vibrations corresponding to the specific speed deviate from the certain range.

The controller may determine whether the freight is stolen on the basis of different certain ranges depending on whether the body is moved.

The controller may determine whether the body has been separated from the freight and determine whether the freight is stolen using the speed and the vibrations when the body has not been separated from the freight.

The logistics device may further include an energy harvesting module configured to generate electric power from the vibrations.

According to another aspect of the present invention, there is provided a logistics control system including the above logistics device and a server configured to receive information on whether the freight is stolen from the logistics device.

According to another aspect of the present invention, there is provided a theft prevention method of a logistics device which is carried together with freight and measures vibrations and a speed, the method including a vibration measurement operation of measuring vibrations of the logistics device, a speed measurement operation of measuring a speed of the logistics device, and a theft determination operation of determining whether the vibrations corresponding to the speed deviates from a certain range at a specific time point.

The theft prevention method may further include, after the speed measurement operation, a movement determination operation of determining whether the logistics device is moved, and the movement determination operation may include determining whether freight is stolen on the basis of different certain ranges depending on whether the logistics device is moved.

The theft prevention method may further include a separation determination operation of determining whether the logistics device has been separated from freight, and the vibration measurement operation and the speed measurement operation may be performed when it is determined in the separation determination operation that the logistics device has not been separated.

Aspects, characteristics, and advantages other than those described above will be apparent from the following detailed description, claims, and drawings for implementing the present invention.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
FIG. 1 is a diagram schematically illustrating a logistics control system according to an exemplary embodiment of the present invention.

Hereinafter, the present invention will be described with reference to the accompanying drawings. Various changes may be made to the present invention, and the invention may have various embodiments, particular embodiments of which will be described in detail with reference to the drawings. However, embodiments according to the concept of the present invention are not construed as limited to the particular embodiments and include all changes and/or equivalents or substitutes that do not depart from the spirit and technical scope of the present invention. In regard to the description of the drawings, like reference numerals refer to like elements.

The term "include," "may include," etc. used in various embodiments of the present invention is to indicate the presence of functions, operations, elements, etc. disclosed herein and does not preclude the presence or addition of one or more functions, operations, elements, etc. In various embodiments of the present invention, the term "include," "have," etc. is to indicate the presence of features, numbers, steps, operations, elements, parts, or combinations thereof described in the specification and does not preclude the presence or addition of one or more other features, numbers, steps, operations, elements, parts, or combinations thereof.

In various embodiments of the present invention, the term "or" or the like includes any one and all combinations of the listed words. For example, "A or B" may include A, B, or both A and B.

While terms "first," "second," etc. used in various embodiments of the present invention may modify various elements of the embodiments, the elements are not limited by the terms. For example, the terms do not limit the sequence and/or importance of the elements. The terms may be used for distinguishing one element from another. For example, both a first user device and a second user device may be user devices and represent different user devices. For example, a first element may be named a second element without departing from the scope of various embodiments of the present invention, and similarly, a second element may be named a first element.

When an element is referred to as being "connected" or "coupled" to another element, it should be understood that the element may be directly connected or coupled to the other element but still another element may also be interposed therebetween. On the other hand, when an element is referred to as being "directly connected" or "directly coupled" to another element, it should be understood that there is no element therebetween.

Terms used in various embodiments of the present invention are for the purpose of describing particular embodiments only and are not intended to limit various embodiments of the present invention. The singular forms are intended to include the plural forms as well unless the context clearly indicates otherwise.

All terms used herein including technical or scientific terms have the same meanings as those generally understood by those skilled in the technical field to which various embodiments of the present invention pertain.

Terms defined in a generally used dictionary should be interpreted as having the same meanings as the contextual meanings of the relevant technology and should not be interpreted as having ideal or exaggerated meanings unless clearly defined in various embodiments of the present invention.

In the following descriptions, a system may be any one, some, or all of a configuration of devices, an operating method of the devices, a computer program for executing the operating method of the devices, and a medium on which the computer program is recorded.

FIG. 1 is a block diagram schematically illustrating a logistics control system according to an exemplary embodiment of the present invention. The logistics control system according to the exemplary embodiment includes a logistics device 200 and a server 300. The logistics device 200 and the server 300 may communicate through a base station.

The logistics device 200 may detect various states including location information and transmit all or some of the detected information to the server 300.

The server 300 may receive information from the logistics device 200 through a communication network and estimate a location of the logistics device 200 or determine a state of freight. In particular, the server 300 may receive information on whether the freight is stolen from the logistics device 200. In addition, the server 300 may determine whether the freight is stolen using map information and global positioning system (GPS) information. The server 300 may provide such information to a person concerned.

Meanwhile, the server 300 and the logistics device 200 are connected through a network, in particular, at least three base stations. In this case, the server 300 and the logistics device 200 may be connected through a low power wide area (LPWA) network. More specifically, the server 300 and the logistics device 200 may be connected through at least one of Sigfox, Lora, Long Term Evolution (LTE for Machines (LTE-M), narrowband Internet of things (NB-IoT), etc. However, the connection is not limited thereto.

Figure 2:
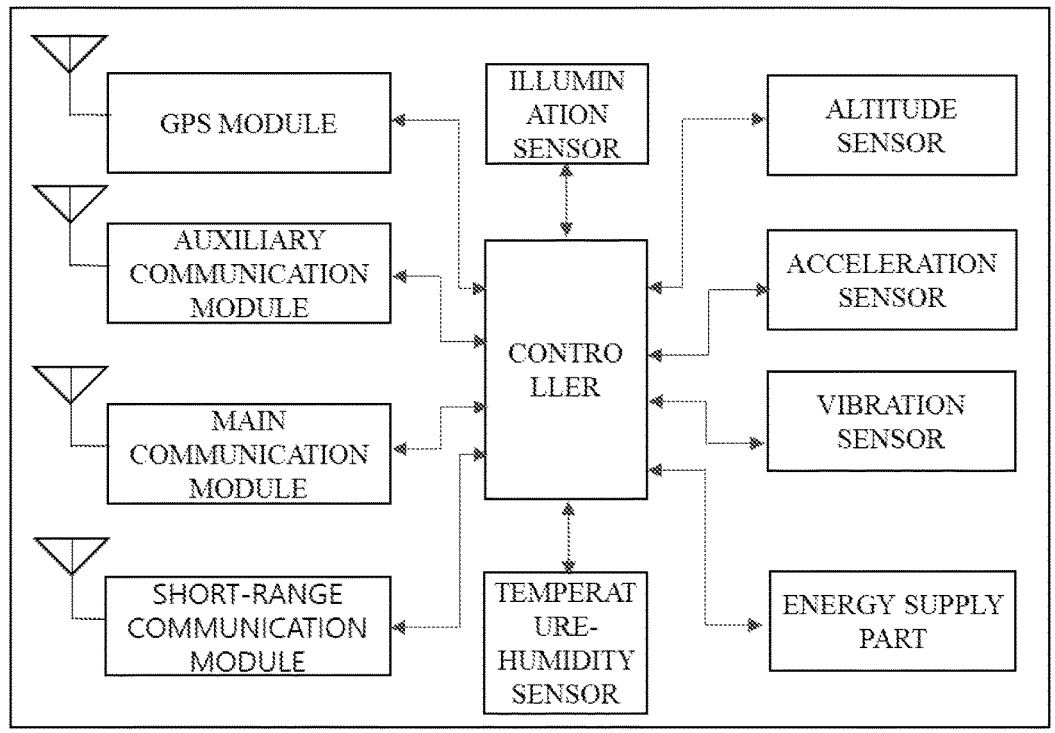
FIG. 2 is a block diagram schematically illustrating a logistics device according to the exemplary embodiment of the present invention.

FIG. 2 is a block diagram schematically illustrating the logistics device 200. The logistics device 200 according to the exemplary embodiment is carried together with freight by at least one of sea, air, and land. For example, the logistics device 200 may be transported from a storehouse to an airport or port by land and transported by ship or plane and then may arrive at the destination by land again. In other words, the logistics device 200 may be transported in a multiple way.

In this case, the freight may be stopped and moved again for various reasons, such as traffic signals, according to circumstances. In other words, the concept of transportation is moving freight from an origin to a destination, which may include moving and stopping.

The logistics device 200 may be moved together with freight, detect surrounding information, and determine a state of the freight or an external state on the basis of the surrounding information. Also, the logistics device 200 may transmit some or all of the detected information to the server 300.

The logistics device 200 includes a body, a vibration sensor, an acceleration sensor, and a controller.

The body includes the logistics device 200 itself and a housing or frame that forms an exterior shape. Also, various elements including a vibration sensor, an acceleration sensor, a controller, etc. described below are provided in the body.

The vibration sensor may measure vibrations applied to the body and transmit information on the vibrations to the controller. For example, the vibration sensor may include a piezo vibration sensor and transmit a voltage corresponding to the vibration to the controller. The controller may measure the vibration using a level of the voltage and a change in the voltage level. As another example, the vibration sensor may transmit a frequency.

The acceleration sensor may measure an acceleration of the body and transmit information on the acceleration to the controller. For example, the acceleration sensor may include a 6-axis acceleration sensor to measure an angular acceleration and acceleration. Alternatively, the acceleration sensor may include a 3-axis acceleration sensor and a gyro sensor to measure an acceleration and an angular acceleration.

When the acceleration sensor transmits the information on the acceleration to the controller, the controller converts the acceleration into a speed and determines a current situation. Alternatively, when the acceleration sensor converts the acceleration into a speed and transmits the speed to the controller, the controller determines a current situation on the basis of the speed.

Meanwhile, the logistics device 200 may include a speed sensor instead of the acceleration sensor. In this case, the speed sensor may transmit the speed of the body to the controller.

The controller is provided in the body and may control elements, such as various sensors, a communication module, a GPS module, etc., of the logistics device 200.

In particular, the controller may determine whether freight is stolen on the basis of a detected signal. More specifically, 85% of freight thefts during land transport occur when the corresponding cars are stopped in service areas or parking lots. To prevent this, the controller may determine whether freight is stolen on the basis of vibrations and an acceleration.

The controller may receive the information on the vibrations from the vibration sensor, receive the information on the acceleration from the acceleration sensor, and determine whether the freight is stolen by analyzing a relationship between the vibrations and the acceleration. This will be described in detail below.

Meanwhile, the logistics device includes an illumination sensor. The illumination sensor may measure ambient illuminance. In particular, when attached to freight, the illumination sensor receives no light or weak light, and when separated from the freight, the illumination sensor receives light. Accordingly, the illumination sensor may be used to determine whether freight is stolen.

The logistics device includes a main communication module. The main communication module includes an LPWA communication module. The main communication module may include an LPWA module such as Sigfox, Lora, LTE-M, NB-IoT, etc.

The logistics device includes a GPS module. The GPS module may measure a current location using signals of satellites. An altitude sensor may measure a current altitude. The vibration sensor may measure vibrations applied to the logistics device 200 and/or freight.

The logistics device 200 may include an auxiliary communication module. The auxiliary communication module is a mobile communication module, such as LTE or the like, and may communicate with the server 300 instead of the main communication module or to assist the main communication module.

The logistics device 200 includes an indoor positioning module. The indoor positioning module is a short-range communication module, such as WiFi, Bluetooth, etc., and may be used for detecting an indoor location of the logistic device 200. The indoor positioning module may also be used for communication.

The logistics device 200 includes a temperature-humidity sensor. The temperature-humidity sensor may measure a temperature and humidity around the logistics device 200.

Meanwhile, the logistics device 200 includes an energy supply part that generates and supplies energy using vibrations. The energy supply part supplies electric power to each element of the logistics device 200. The energy supply part includes an energy harvesting module. More specifically, the energy harvesting module may be a vibration energy harvesting module that generates electricity using vibrations.

Since the logistics device 200 is moved together with freight, vibrations occur during the movement. Accordingly, the vibration energy harvesting module may generate power required to drive the logistics device 200 during the movement. The vibration energy harvesting module may include a piezo which generates power from vibrations, a rectifier which rectifies the generated power, and a super capacitor which stores electric energy.

Initially, the logistics device 200 is charged by an external power source. During the movement, power is generated by the vibration energy harvesting module such that the logistics device 200 is driven.

However, the present invention is not limited thereto, and the logistics device 200 may selectively include the above-described elements.

The logistics device 200 may transmit information detected by each element to the server 300. For example, the controller of the logistics device 200 may determine whether the freight is stolen, which will be described below, and transmit the determination result to the server 300.

The server 300 may receive and provide the determination result to a person concerned.

Figure 3:
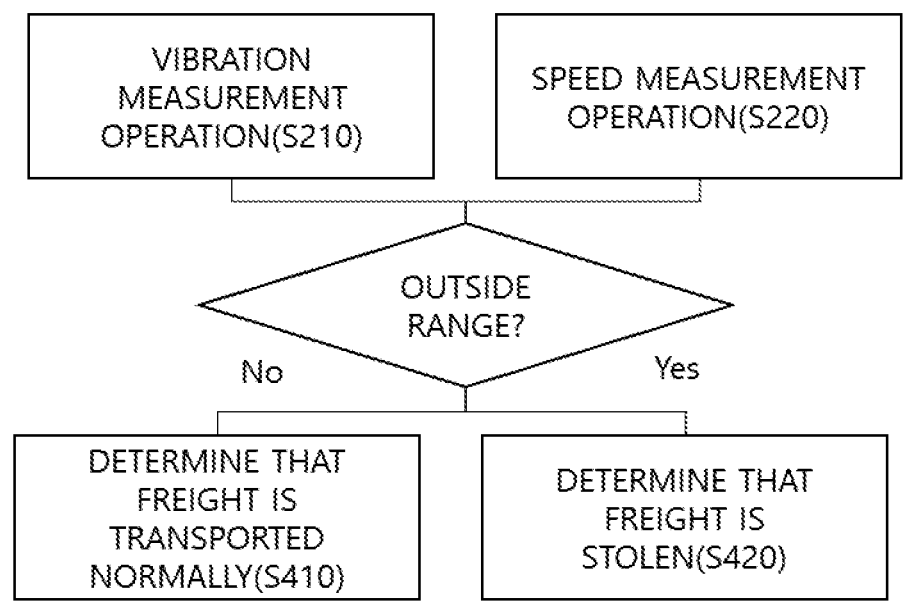
FIG. 3 is a flowchart schematically illustrating a theft prevention method of a logistics device according to the exemplary embodiment of the present invention.
Figure 4:
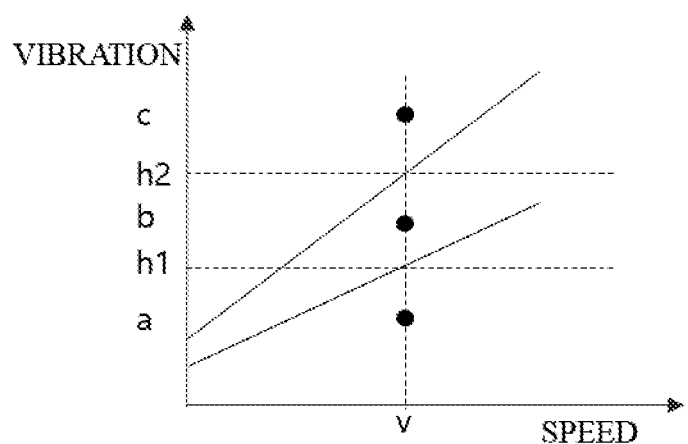
FIG. 4 is a graph schematically illustrating a theft prevention method of a logistics device according to the exemplary embodiment of the present invention.

FIGS. 3 and 4 are a flowchart and graph schematically illustrating a theft prevention method of a logistics device according to the exemplary embodiment of the present invention.

The controller may measure a speed of the body and vibrations applied to the body and determine whether freight is stolen using the speed and vibrations. The controller may determine whether the freight is stolen by analyzing a relationship between the speed and vibrations. The speed of the body may be calculated by the controller receiving an acceleration from the acceleration sensor or measured by the speed sensor. The vibrations of the body may be measured by the vibration sensor.

A vibration measurement operation S210 of measuring vibrations of the body and a speed measurement operation S220 of measuring a speed of the body are performed. More specifically, the controller measures vibrations applied to the body through the vibration sensor. Also, the controller measures a speed of the body using the speed sensor or the acceleration sensor. The vibration measurement operation S210 and the speed measurement operation S220 may be performed in parallel. However, the present invention is not limited thereto, and the vibration measurement operation S210 and the speed measurement operation S220 may be performed in sequence.

When vibrations of the body corresponding to a speed of the body deviate from a certain range at a specific time point, the controller may determine that the freight is stolen. A theft determination operation S300 of determining whether the vibrations corresponding to the speed are within the certain range at the specific time point is performed.

More specifically, referring to FIG. 4, the certain range is set in advance by analyzing vibrations according to speed in a freight transportation process. After that, when vibrations measured at a current speed deviate from the certain range, it is determined that the freight is stolen.

Here, the relationship between vibrations and speed may be illustrated as a graph shown in the drawing. In other words, an allowable vibration range according to speed is set in advance. The higher the speed, the wider the allowable vibration range may be.

The certain range may vary depending on a vehicle type and also a road condition and the like.

For example, when a vibration b corresponding to a specific AAA v of the body is within a certain range of h1 to h2, the controller determines that the freight is transported normally (S410).

On the other hand, when a vibration corresponding to the specific speed v of the body is a or c, the controller determines that the freight is stolen (S420). The controller transmits the determination result to the server and transmits a notification to a person concerned such as a driver and the like.

Meanwhile, the controller may not set the certain range in advance but may set the certain range by analyzing the vibrations and speed. After the vibration measurement operation S210 and the speed measurement operation S220, a certain range of vibration with respect to speed may be set, or a certain range of speed with respect to vibration may be set.

Meanwhile, with a logistics device, a logistics control system, and a theft prevention method according to another exemplary embodiment, it may be determined whether freight is stolen on the basis of different certain ranges depending on whether the freight is moved. In the description of the present exemplary embodiment, the above description will be omitted.

Figure 5:
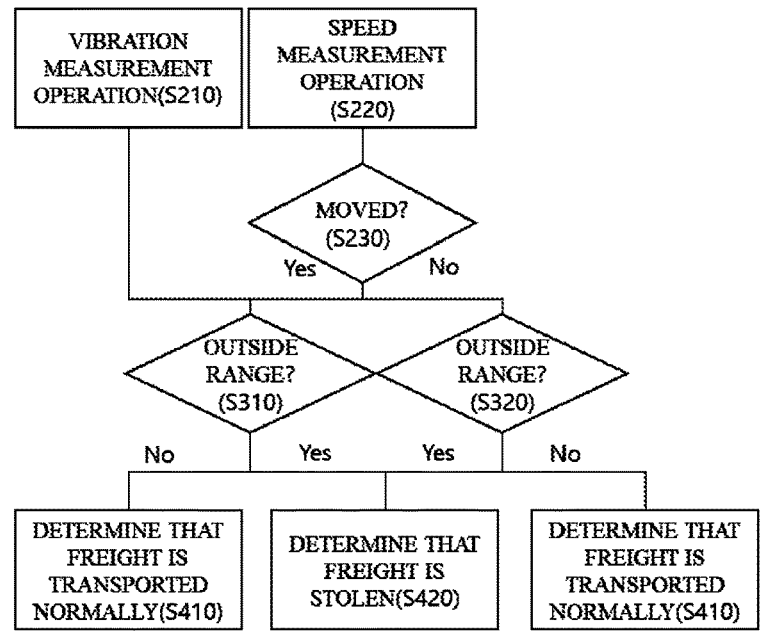
FIG. 5 is a flowchart schematically illustrating a theft prevention method of a logistics device according to another exemplary embodiment of the present invention.

Referring to FIG. 5, after the speed measurement operation S220, a movement determination operation S230 of determining whether a body is moved may be additionally performed. In other words, when a vehicle moves, a controller may receive a speed or acceleration from a speed sensor or an angular speed sensor and determine whether the vehicle moves. Specifically, when the measured speed is 0, the controller determines that the vehicle is at a standstill and the body is stopped.

When the vehicle moves, the controller may determine whether freight is stolen by determining whether a measured vibration deviates from an allowable movement range, which is the certain range according to the above-described exemplary embodiment (S310).

When the vehicle is at a standstill, the controller may determine whether the freight is stolen by determining whether a measured vibration deviates from an allowable stop range, which is a certain range (S320). In this case, the speed is 0, and thus whether the freight is stolen is determined on the basis of vibrations.

Since the allowable stop range corresponds to a speed of 0, analysis thereof may differ from analysis of the allowable movement range. In particular, when the vehicle stops, vibrations of the vehicle differs from vibrations caused by the engine during movement, or when the engine stops, there is almost no vibrations. Accordingly, analysis of the allowable stop range may differ from analysis of the allowable movement range. In other words, it is necessary to separately analyze an allowable vibration range for a stop. Therefore, according to the present exemplary embodiment, it is possible to determine whether freight is stolen more accurately.

Figure 6:
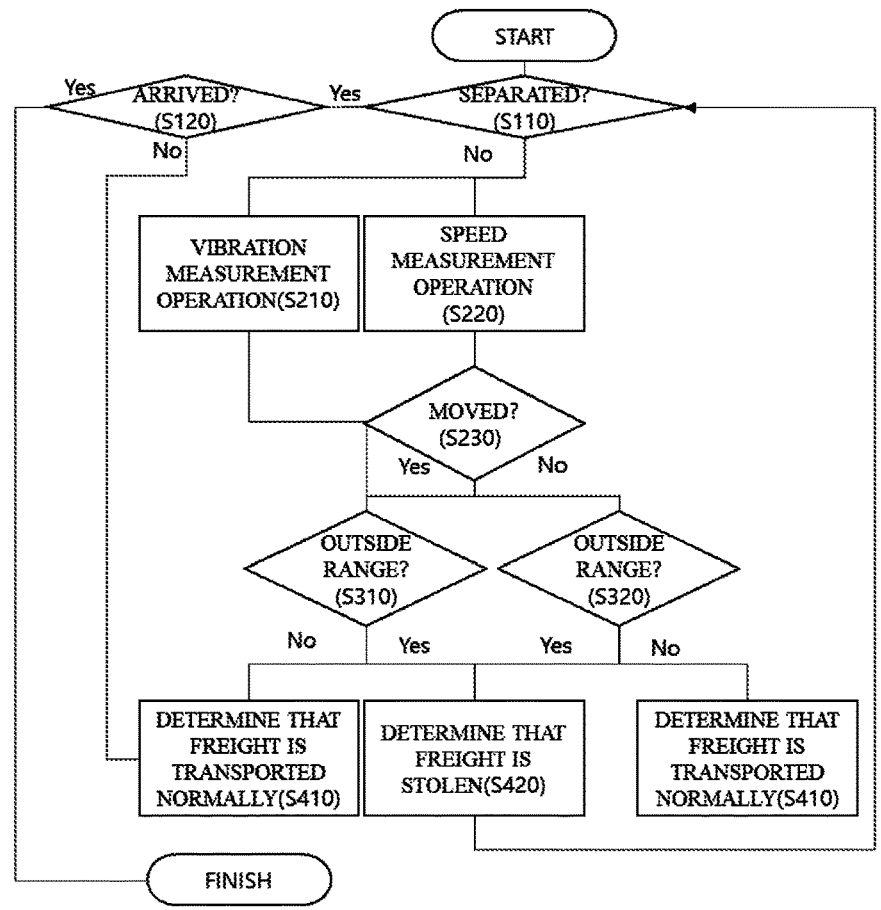
FIG. 6 is a flowchart schematically illustrating a theft prevention method of a logistics device according to still another exemplary embodiment of the present invention.

Referring to FIG. 6, a logistics device, a logistics control system, and a theft prevention method according to still another exemplary embodiment will be described below. In the description of the present exemplary embodiment, the above description will be omitted.

A controller may determine whether a body has been separated from freight and may determine whether freight is stolen using a speed and vibrations according to the above-described exemplary embodiments when the body has not been separated from the freight.

More specifically, a logistics device may additionally include a detachment sensing part. The detachment sensing part may include the above-described illumination sensor. The detachment sensing part will be described in detail below.

The detachment sensing part may detect whether a logistics security device 200 is detached from freight 1. More specifically, when the logistics security device 200 is delivered together with the freight 1, the detachment sensing part may detect whether the logistics security device 200 is in contact with the freight 1 and transmit the sensing result to a controller 210.

Figure 7:
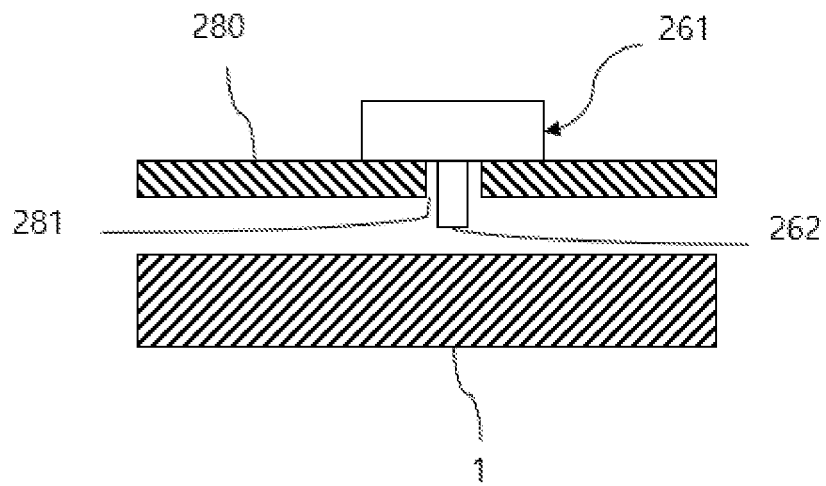
FIGS. 7 to 9 are cross-sectional views schematically illustrating a logistics device according to another exemplary embodiment of the present invention.

Referring to FIG. 7, the detachment sensing part may include a contact sensor 261 that detects whether the logistics security device 200 is in contact with the freight 1. For example, the contact sensor 261 may be any one of a switch sensor, a microswitch sensor, and a miniature snap-action switch. The contact sensor 261 is not limited thereto and may include a strain gauge, a load cell, etc.

The contact sensor 261 may be disposed in a body 280. More specifically, the body 280 includes a hole 281 that a pin 262 of the contact sensor 261 passes through. In other words, the contact sensor 261 is disposed in the body 280, and the pin 262 is exposed to the outside through the hole 281 of the body 280. Accordingly, the contact sensor 261 may detect whether the logistics security device 200 is in contact with an object through the pin 262.

For example, when the logistics security device 200 is attached to the freight 1, the pin 262 is moved to the inside of the body 280. In this state, the contact sensor 261 determines that the logistics security device 200 is in contact with the freight 1 and transmits the determination result to the controller 210.

When the logistics security device 200 is detached from the freight 1 due to collision or intentionally, the pin 262 is moved to the outside of the body 280. The contact sensor 261 detects this state and transmits the sensing result to the controller 210.

Figure 8:
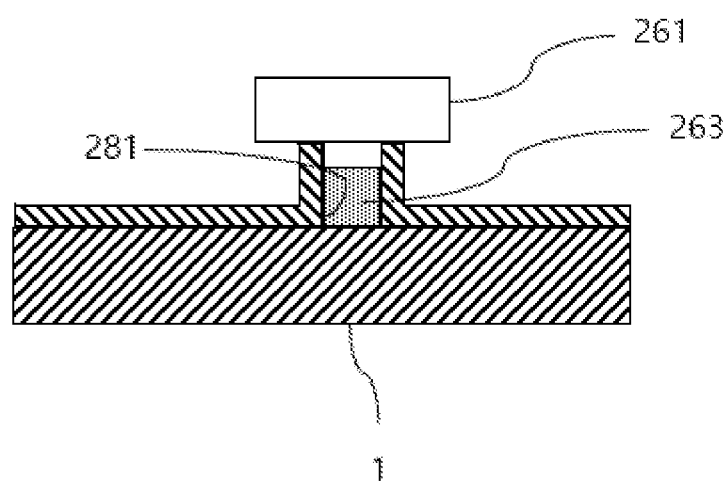

Referring to FIG. 8, the detachment sensing part may additionally include powder 263 that may be disposed between the contact sensor 261 and the freight 1. The powder 263 is disposed in a hole 281 of the body 280. The hole 281 of the body 280 may be sealed by the contact sensor 261 and the freight 1. Accordingly, when the logistics security device 200 is attached to the freight 1, the powder 263 does not leak from the hole 281 of the body 280 and presses the contact sensor 261.

When the freight 1 is arbitrarily removed during the delivery of the freight 1, the powder 263 leaks, and the contact sensor 261 detects and transmits the contact state to the controller 210.

In this way, the logistics security device 200 according to the present exemplary embodiment includes the powder 263 that easily leaks and thus may sensitively change a state of the contact sensor 261. The powder 263 may be replaced by fluid or a spring.

Figure 9:
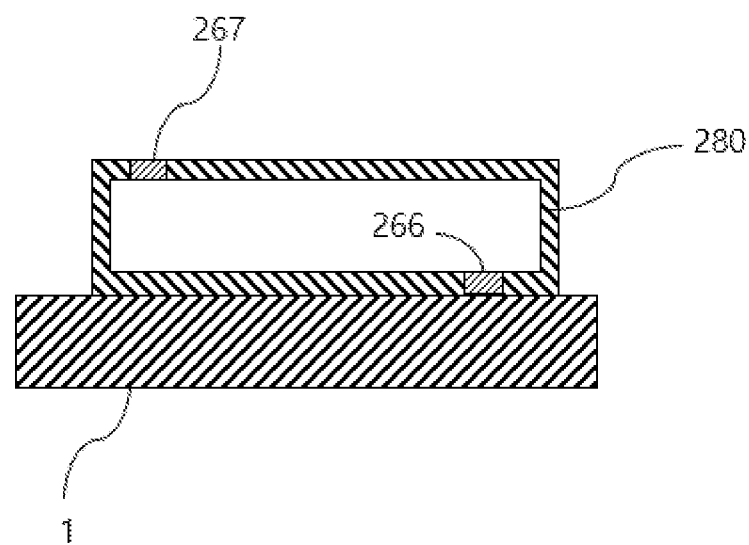

FIG. 9 is a schematic cross-sectional view of a logistics security device 200 according to a still another exemplary embodiment of the present invention. The logistics security device 200 according to the present exemplary embodiment may include an illumination sensor.

More specifically, a detachment sensing part may include a main illumination sensor 266 that is be provided on one side of a body 280 and detects whether the logistics security device 200 is in contact with freight 1. The main illumination sensor 266 is provided in one side of the body 280 that comes into contact with the freight 1. Accordingly, when the body 280 is arbitrarily detached from the freight 1 after coming into contact with the freight 1, the main illumination sensor 266 recognizes light according to the ambient brightness and transmits the recognition result to a controller 210.

Meanwhile, the detachment sensing part may be provided in the body 280 but not in a portion that comes into contact with the freight 1. For example, a sub-illumination sensor 267 may be provided in another side of the body 280 opposite to the main illumination sensor 266. In other words, the sub-illumination sensor 267 may be disposed on the opposite side of the main illumination sensor 266. However, the location of the sub-illumination sensor 267 is not limited thereto.

Therefore, the controller 210 may detect whether the logistics security device 200 is detached from the freight 1 more accurately according to a difference between the amounts of light detected by the main illumination sensor 266 and the sub-illumination sensor 267. For example, when there is no difference or a slight difference between the amounts of light detected by the main illumination sensor 266 and the sub-illumination sensor 267, the controller 210 may determine that the logistics security device 200 is removed from the freight 1.

According to the above-described exemplary embodiments, the controller 210 may receive a sensing result from the detachment sensing part and determine and transmit whether the logistics security device 200 is detached to a server 300.

Meanwhile, to strengthen security, the above-described contact sensor 261 and the main illumination sensor 266 may be provided together. In this case, the main illumination sensor 266 is disposed on an edge of the body 280, and the contact sensor 261 may be disposed on an inner side than the main illumination sensor 266.

As described above, the logistics security device 200 may be carried together with freight, and a logistics security system can use a biometric authentication result to strengthen user verification. The logistics security device 200 according to exemplary embodiments of the present invention can determine a state of freight 1 from information on an event that occurs during the delivery.

Also, the logistics security device according to exemplary embodiments of the present invention can accurately determine whether the logistics security device is detached from freight, thereby strengthening security.

Referring back to FIG. 6, the controller receives information on whether the body has been separated from the freight and determines whether the body has been separated from the freight (S110).

When it is determined that the body has not been separated from the freight, the controller performs a vibration measurement operation S210 and a speed measurement operation S220 and determines whether the freight is stolen. When it is determined that the freight is transported normally (S410), the controller determines again whether the body has been separated from the freight (S110).

Meanwhile, when it is determined that the body has not been separated from the freight, the controller determines whether the freight or body has arrived in a destination (S120). When a location received from a GPS module corresponds to the destination, it is determined that the freight or body has arrived in the destination. When a location received from a GPS module does not correspond to the destination, it is determined that the freight or body has not arrived in the destination.

When it is determined that the freight or body has arrived in the destination, the controller finishes the theft prevention process.

However, when it is determined that the freight or body has not arrived in the destination, the controller determines that the freight is stolen and notifies a person concerned of the determination result.

Meanwhile, the operation S110 of determining whether the body has been separated from the freight is performed when transportation of the freight begins. More specifically, the controller may determine that the transportation begins when a location received from the GPS module does not correspond to an origin.

Alternatively, the controller may perform the operation S110 of determining whether the body has been separated from the freight when no signal is received from the GPS module.

According to the present embodiment, it is determined whether freight is stolen depending on whether a logistics device is detached and using speed and vibrations. Accordingly, it is possible to accurately determine whether freight is stolen.

With a logistics device, a logistics control system, and a theft prevention method according to exemplary embodiments of the present invention, whether freight is stolen is determined using a speed and vibrations. Accordingly, it is possible to accurately determine whether freight is stolen.

With a logistics device, a logistics control system, and a theft prevention method according to another exemplary embodiment of the present invention, it is possible to determine whether freight is stolen using a speed or vibrations and whether the logistics device is detached. Accordingly, it is possible to accurately determine whether freight is stolen.

The scope of the present invention is not limited to the effects.

Although embodiments of the present invention have been described above with reference to the accompanying drawings, those skilled in the technical field to which the present invention pertains should understand that various modifications and equivalents can be made from the embodiments. Therefore, the actual technical scope of the present invention should be determined by the technical spirit of the following claims.

EXPLANATION OF REFERENCE

200 logistics device
300 server

What is claimed is:

1. A logistics device which is carried together with freight to detect a state, the logistics device comprising:
   a body carried together with freight; and
   a controller configured to measure a speed of the body and vibrations applied to the body and determine whether the freight is stolen using the speed and the vibrations,
   wherein, when the vibrations of the body corresponding to the speed of the body deviate from a certain range at a specific time point, the controller determines that the freight is stolen, and
   further comprising:
   an acceleration sensor provided in the body and configured to detect an acceleration; and
   a vibration sensor provided in the body and configured to detect the vibrations,
   wherein the controller measures the speed after receiving information on the vibrations from the vibration sensor and receiving information on the acceleration from the acceleration sensor and determines that the freight is stolen when the specific vibrations corresponding to the specific speed deviate from the certain range.

2. The logistics device of claim 1, further comprising:
   a speed sensor provided in the body and configured to detect the speed;
   wherein the controller receives information on the vibrations from the vibration sensor, receives information on the speed from the speed sensor, and determines that the freight is stolen when the vibrations corresponding to the specific speed deviate from the certain range.

3. The logistics device of claim 2, wherein the controller determines whether the freight is stolen on the basis of different certain ranges depending on whether the body is moved.

4. The logistics device of claim 1, wherein the controller determines whether the freight is stolen on the basis of different certain ranges depending on whether the body is moved.

5. The logistics device of claim 1, wherein the controller determines whether the body has been separated from the freight and determines whether the freight is stolen using the speed and the vibrations when the body has not been separated from the freight.

6. The logistics device of claim 1, further comprising an energy harvesting module configured to generate electric power using the vibrations.

7. A logistics control system comprising:
   the logistics device of claim 1; and
   a server configured to receive information on whether the freight is stolen from the logistics device.

8. A theft prevention method of a logistics device which is carried together with freight and measures vibrations and a speed, the theft prevention method comprising:
   a vibration measurement operation of measuring vibrations of the logistics device;
   a speed measurement operation of measuring a speed of the logistics device; and
   a theft determination operation of determining whether the vibrations corresponding to the speed deviates from a certain range at a specific time point,
   wherein, when the vibrations of the logistics device corresponding to the speed of the logistics device deviate from a certain range at a specific time point, determining that the freight is stolen, and
   further comprising:
   an acceleration sensor provided in the logistics device for detecting an acceleration; and
   a vibration sensor provided in the logistics device for detecting the vibrations,
   measuring the speed after receiving information on the vibrations from the vibration sensor and receiving information on the acceleration from the acceleration sensor and determining that the freight is stolen when the specific vibrations corresponding to the specific speed deviate from the certain range.

9. The theft prevention method of claim 8, further comprising, after the speed measurement operation, a movement determination operation of determining whether the logistics device is moved, wherein the movement determination operation comprises determining whether freight is stolen on the basis of different certain ranges depending on whether the logistics device is moved.

10. The theft prevention method of claim 8, further comprising a separation determination operation of determining whether the logistics device has been separated from freight,
wherein the vibration measurement operation and the speed measurement operation are performed when it is determined in the separation determination operation that the logistics device has not been separated.

* * * * *